(12) United States Patent
Hofer et al.

(10) Patent No.: US 9,809,259 B2
(45) Date of Patent: Nov. 7, 2017

(54) METHOD OF MANUFACTURING A VEHICLE AND VEHICLE

(71) Applicant: MAGNA STEYR Fahrzeugtechnik AG & Co KG, Graz (AT)

(72) Inventors: Bernhard Hofer, Graz (AT); Harald Zachnegger, Graz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 0 days.

(21) Appl. No.: 14/817,234

(22) Filed: Aug. 4, 2015

(65) Prior Publication Data

US 2016/0039475 A1 Feb. 11, 2016

(30) Foreign Application Priority Data

Aug. 5, 2014 (EP) .................................... 14179899

(51) Int. Cl.
| | | |
|---|---|---|
| B32B 7/08 | (2006.01) | |
| B29C 65/00 | (2006.01) | |
| B32B 27/00 | (2006.01) | |
| B32B 37/00 | (2006.01) | |
| F16B 35/02 | (2006.01) | |
| F16B 43/02 | (2006.01) | |
| B62D 27/02 | (2006.01) | |
| F16B 11/00 | (2006.01) | |
| B29C 65/72 | (2006.01) | |
| B29C 65/48 | (2006.01) | |
| B29C 65/56 | (2006.01) | |
| B62D 25/02 | (2006.01) | |
| F16B 5/02 | (2006.01) | |

(52) U.S. Cl.
CPC .......... B62D 27/026 (2013.01); F16B 11/006 (2013.01); B29C 65/48 (2013.01); *B29C 65/562* (2013.01); *B29C 65/72* (2013.01); *B62D 25/025* (2013.01); *F16B 5/025* (2013.01)

(58) Field of Classification Search
CPC ...... F16B 5/0233; F16B 5/025; F16B 5/0283; F16B 11/006; B62D 27/026; Y10T 403/75; B29C 65/48; B29C 65/562; B29C 65/72
USPC .......... 156/60, 91, 92, 278, 292, 295, 304.1, 156/304.2, 304.3, 304.5; 411/378, 383, 411/384, 546
See application file for complete search history.

(56) References Cited

U.S. PATENT DOCUMENTS

| | | | |
|---|---|---|---|
| 2003/0077118 A1 | 4/2003 | Kobusch et al. | |
| 2012/0139292 A1* | 6/2012 | Hofer | B62D 63/025 296/181.1 |

FOREIGN PATENT DOCUMENTS

| | | |
|---|---|---|
| CN | 101033767 A | 9/2007 |
| CN | 102530124 A | 7/2012 |
| DE | 102006033751 A1 | 1/2008 |

(Continued)

OTHER PUBLICATIONS

Flexitol product information sheet. Boelhoff. https://www.boellhoff.com/files/pdf1/flexitol-en-0590.pdf.*

*Primary Examiner* — Philip Tucker
*Assistant Examiner* — Brian R Slawski
(74) *Attorney, Agent, or Firm* — Jordan IP Law, LLC; Todd A. Vaughn

(57) ABSTRACT

A method for producing a motor vehicle and a correspondingly produced motor vehicle having a modular construction, in which a substructure and at least one superstructure module are produced independently of one another and are subsequently permanently connected together.

17 Claims, 4 Drawing Sheets

(56) References Cited

FOREIGN PATENT DOCUMENTS

| DE | 202008011318 U1 | 11/2008 | |
|---|---|---|---|
| DE | 102012007318 A1 * | 10/2013 | ............ F16B 11/006 |
| DE | 102012217960 A1 | 4/2014 | |
| EP | 1304489 A2 | 4/2003 | |
| EP | 1744063 A2 | 1/2007 | |
| EP | 1764516 A2 | 3/2007 | |
| EP | 1832759 A1 | 9/2007 | |

* cited by examiner

METHOD OF MANUFACTURING A VEHICLE AND VEHICLE

CROSS-REFERENCE TO RELATED APPLICATIONS

The present application claims priority 35 U.S.C. §119 to European Patent Publication No. EP 14179899.1 (filed on Aug. 5, 2014), which is hereby incorporated by reference in its entirety.

TECHNICAL FIELD

Embodiments relates to a method for producing a motor vehicle and a correspondingly produced motor vehicle. In particular, the invention relates to motor vehicles which are produced in a modular construction, wherein a substructure and further superstructure modules of the motor vehicle are produced independently of one another and are subsequently permanently connected together.

BACKGROUND

Such methods for producing motor vehicles by way of modules are known per se. European Patent Publication No. EP 2 463 181 A2 discloses a method for producing a motor vehicle in which preassembled modules are joined in an assembly line to form a complete vehicle. The modules are painted before the joining process and the assembly takes place by bonding and/or screwing the modules to one another.

The bonding of a superstructure module to a substructure, however, is difficult in many respects as high requirements are set for the rigidity and strength of the connection and, therefore, prolonged curing of the adhesive is generally required, which lengthens the production cycles, and for a stable adhesively-bonded connection the component tolerances also have to be extremely low in order to achieve an accurate bearing of the bonding surfaces against one another, whereby the production is additionally complicated.

SUMMARY

Embodiments relate to a method for producing a motor vehicle which permits a high degree of vehicle rigidity and a high degree of structural strength in the event of a crash and at the same time permits rapid production cycles.

Embodiments relate to a motor vehicle with increased structural strength.

In accordance with embodiments, a method for producing a motor vehicle comprises at least one of the following: producing a substructure and at least one superstructure module of the motor vehicle, wherein the substructure and the superstructure module in each case have at least one edge region; painting at least the edge region of the substructure and/or the superstructure module; connecting the edge regions of the substructure and the superstructure module by way of adhesive, wherein the substructure and the superstructure module are positioned relative to one another by way of a tolerance-compensating screw connection, so that the edge regions of the substructure and the superstructure module are fixed in the relative position thereof during the curing of the adhesive by way of the tolerance-compensating screw connection.

In accordance with embodiments, the substructure and superstructure module may be produced independently of one another and already painted, in particular, immersion painted, before being connected. In this case, at least one of the edge regions or both edge regions are painted, and generally all of the components are painted.

In accordance with embodiments, the term "substructure" used herein, similar to the superstructure module, may also refer to a module and/or substructure module which may be understood as a prefabricated assembly of a structural unit. Equipment components may already be accommodated therein. Often the substructure is a module which is equivalent to the superstructure module in terms of the level of construction, for example both may already be painted, as mentioned above.

By the use of a tolerance-compensating screw connection, even with the presence of a gap between the components it is possible to retain the two components of the substructure and the superstructure module in position relative to one another and to fix said components in this position. As a result, in addition to the connecting action of the screw connection, the further treatment of the connection consisting of the substructure and the superstructure module is also possible, even if the adhesive is not yet cured, as cross-linking errors of the adhesively-bonded connection are prevented by way of the fixed positioning. A deformation of the substructure and the superstructure module is prevented by the tolerance-compensating screw connection, even if a gap exists between the modules, in addition to damage to the surfaces of the components, in particular the paint layers thereof.

In accordance with embodiments, by way of the tolerance-compensating screw connection, a spacing is bridged between the substructure and the superstructure module. The components of the substructure and the superstructure module may, therefore, be produced having greater tolerances.

In accordance with embodiments, the tolerance-compensating screw connection is an automatic tolerance-compensating system which, in turn, may be adjusted to an existing spacing between the substructure and the superstructure module. Such screw connections are able to be obtained, in particular, under the trade name FLEXITOL® from Wilhelm Bollhoff GmbH & Co KG.

In accordance with embodiments, the tolerance-compensating screw connection may comprise a sleeve with a first internal thread which is inserted into the substructure or the superstructure module, an adjusting element with an internal thread and an external thread which is screwed into the internal thread of the sleeve, and a screw with an external thread which is screwed through an opening of the other of the two components, namely the superstructure module or the substructure, into the internal thread of the adjusting element.

In accordance with embodiments, the substructure or the superstructure module has a tongue in the edge region and the other of the two components has a groove in the edge region. For connecting the edge regions of the substructure and the superstructure module, adhesive is introduced into the groove as an adhesive bath and the tongue is introduced into the adhesive bath. In such a connection, by way of the tolerance-compensating screw connection no contact has to exist between the tongue and the groove. Even if contact results between the tongue and groove, there is no risk of corrosion as this region is surrounded by adhesive and is therefore sealed.

Alternatively or additionally, adhesively-bonded connections which use parallel bonded surfaces, in particular, parallel flange surfaces of the components for bonding, may also be used.

In accordance with embodiments, the tongue comprises holes so that adhesive is able to pass through the holes in order to achieve a positive connection, in addition to the material connection, and thus increase the strength of the connection.

In accordance with embodiments, the substructure and the superstructure module may also be riveted in addition to the adhesively-bonded connection and the connection by way of a tolerance-compensating screw connection.

In accordance with embodiments, the tolerance-compensating screw connection remains in the motor vehicle after the production of the vehicle, so as not only to simplify the production process but also to increase the strength and rigidity in the finished vehicle.

In accordance with embodiments, a motor vehicle comprises at least one of: a substructure and at least one superstructure module of the motor vehicle, wherein the substructure and the superstructure module in each case have at least one edge region, wherein at least the edge region of the substructure and/or the superstructure module are connected by way of adhesive, wherein the substructure and the superstructure module are positioned relative to one another by way of a tolerance-compensating screw connection, so that the edge regions of the substructure and the superstructure module are fixed in the relative position thereof by way of the tolerance-compensating screw connection.

In accordance with embodiments, a motor vehicle may naturally comprise all of the features cited for the production method.

DRAWINGS

Embodiments will be illustrated by way of example in the drawings and explained in the description below.

DESCRIPTION

Figure 1:
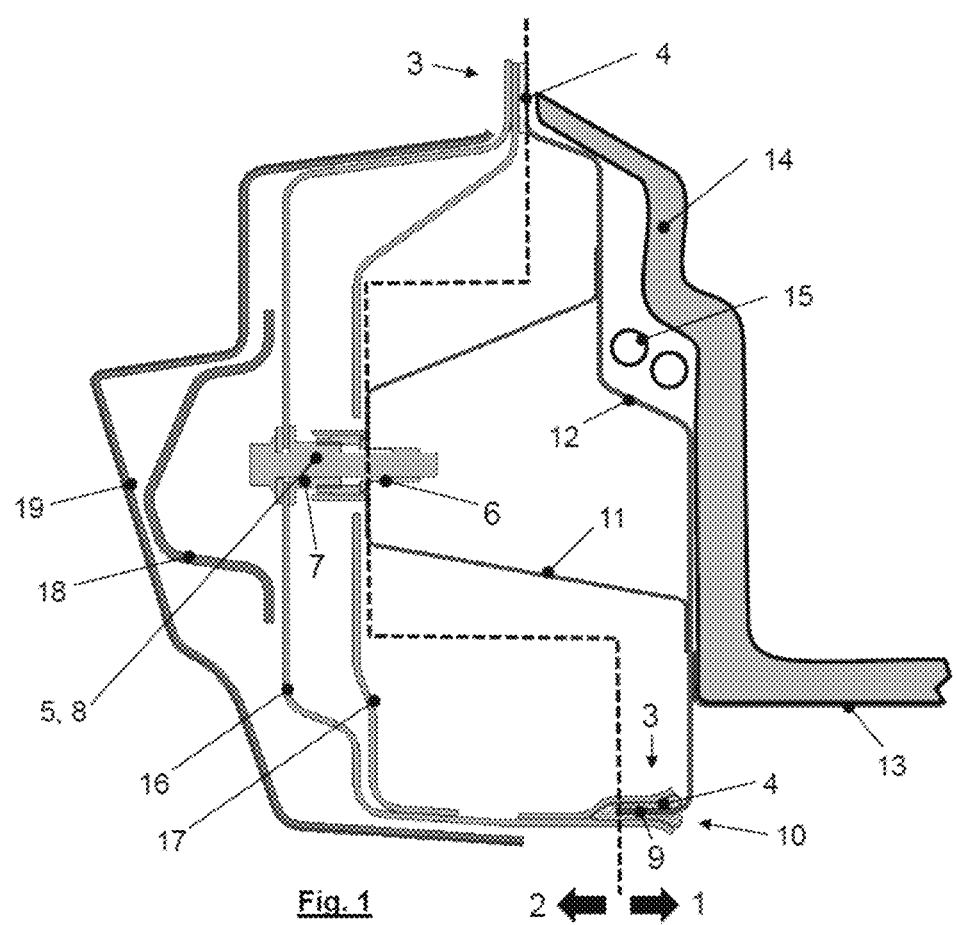
FIG. 1 illustrates a sectional view of a sill of a motor vehicle in accordance with embodiments, and the result of a method in accordance with embodiments.

As illustrated in FIG. 1, a substructure 1 is shown to the right of the dashed line, the substructure 1 comprising a first base part 11, a second base part 12, a third base part 13, and a carpet 14 mounted on the third base part 13. Arranged between the second and third base parts 12, 13, are electrical cables 15 which are laid below the carpet 14. A superstructure module 2 is shown to the left of the dashed line, the superstructure module 2 comprising a first side wall part 16, a second side wall part 17, a first sill cladding part 18 and a second sill cladding part 19.

The first base part 11 and the first side wall part 16 are permanently connected together by way of a tolerance-compensating screw connection 5. The tolerance-compensating screw connection 5 passes through an opening of the second side wall part 17 and bridges a spacing between the first base part 11 and the first side wall part 16. The tolerance-compensating screw connection 5 comprises a sleeve 6, an adjusting element 7, and a screw 8. The sleeve 6 has a first internal thread and is configured for insertion into an opening of the first side wall part 16 of the substructure 1. The adjusting element 7 has an internal thread and an external thread, and is configured to be screwed into the internal thread of the sleeve 6 and/or fastened by way of a cage to the sleeve 6. The screw 8 has an external thread which is configured to be screwed through an opening of the first side wall part 16 of the superstructure module 2 into the internal thread of the adjusting element 7 and the sleeve 6.

The substructure 1, particularly, the second base part 12, and the superstructure module 2, particularly, the first side wall part 16 and the second side wall part 17, have two edge regions 3 which are already immersion painted (not illustrated), and are connected by way of adhesive 4. In the edge region 3, as illustrated in FIG. 1 at the top, parallel bonding surfaces thereof are adhesively-bonded together, and in the edge region 3 illustrated at the bottom of FIG. 1, the first side wall part 16 forms a groove 10 filled with adhesive 4, and thus, an adhesive bath, into which a tongue 9, namely the edge of the second base part 12, is immersed in order to become adhesively-bonded in this manner.

Figure 2:
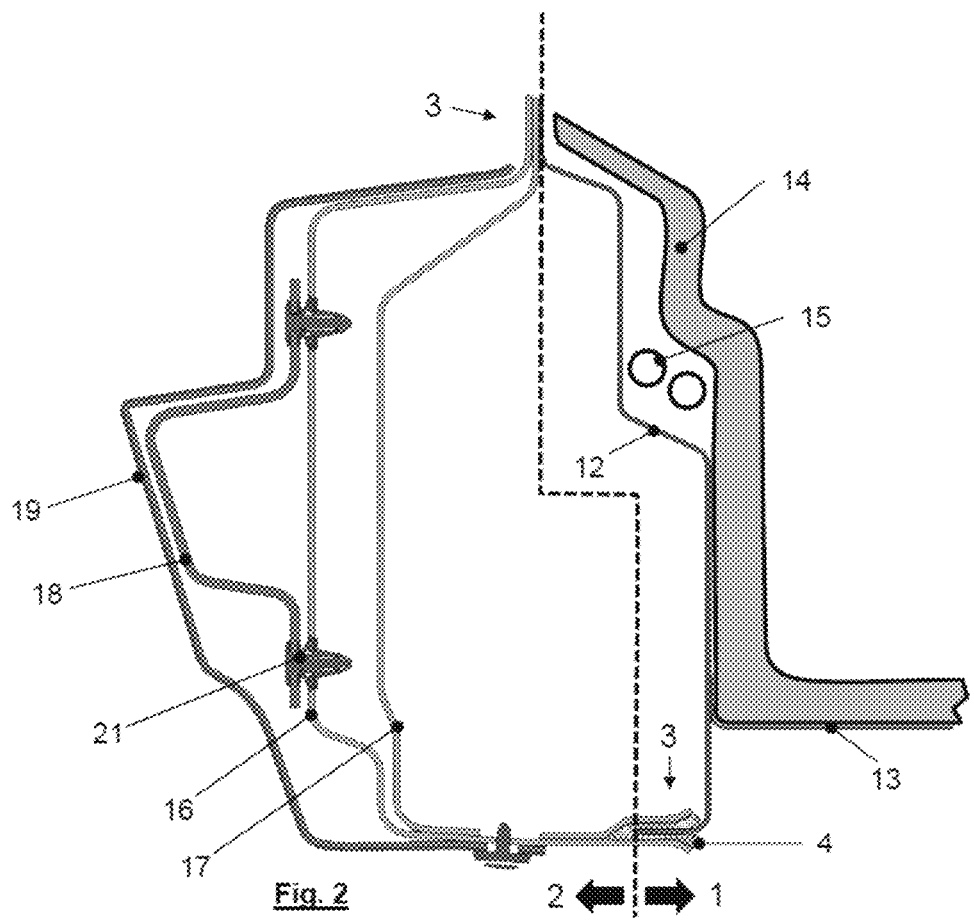
FIG. 2 illustrates a sectional view in a further cutting plane of the sill of FIG. 1.

FIG. 2 illustrates a sectional view in a further cutting plane of a sill of FIG. 1, and shows that in this further cutting plane, in which there is no tolerance-compensating screw connection 5, the first side wall part 16 and the first sill cladding part 18, which serves to cover the tolerance-compensating screw connections, are connected together by way of connecting elements 21. Together with the sill cladding part 19 and the second side wall part 17 they form an assembly and/or a superstructure module 2.

Figure 3:
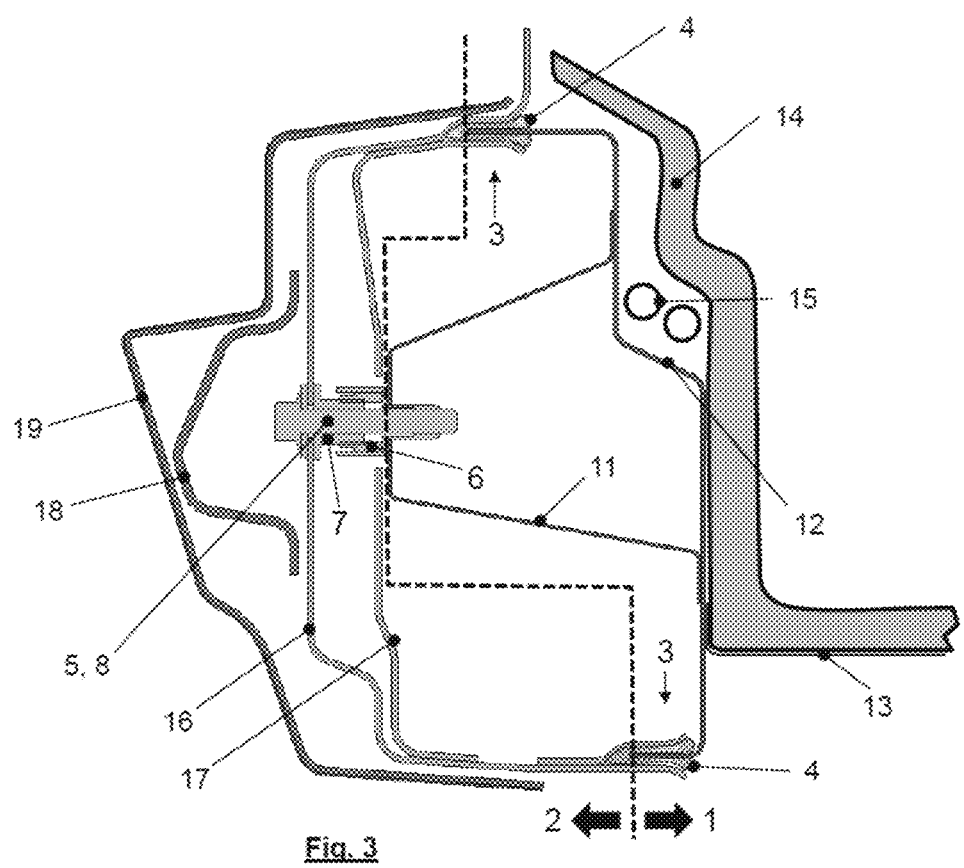
FIG. 3 illustrates a sectional view of the sill of FIG. 1, in accordance with embodiments.

FIG. 3 illustrates an alternative embodiment of a sill or a further cutting plane of the same sill of FIGS. 1 and 2, wherein an adhesive bath is used in both edge regions 3, and in each case, the superstructure module 2 forms a groove for the adhesive bath and the substructure 1 forms a tongue which is immersed into the adhesive bath.

Figure 4:
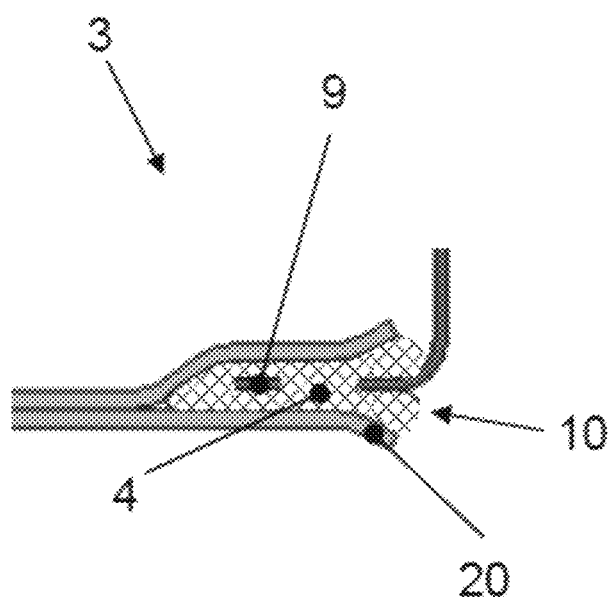
FIG. 4 illustrates a detailed view of an adhesively-bonded connection which may be used in a method in accordance with embodiments.

As illustrated in FIG. 4, a tongue 9 submerged into an adhesive bath and a parallel bonded edge region 3, may have one or more openings, and thus, may be formed as a perforated flange so that adhesive 4 may pass through the openings in order to strengthen the connection further. The edges of the superstructure module forming a groove 10 have oblique guide surfaces 20 as an insertion aid for securely joining said edges and for collecting escaped adhesive.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

1 Substructure
2 Superstructure module
3 Edge region
4 Adhesive

5 Tolerance-compensating screw connection
6 Sleeve
7 Adjusting element
8 Screw
9 Tongue
10 Groove
11 First base part
12 Second base part
13 Third base part
14 Carpet
15 Electrical cables
16 First side wall part
17 Second side wall part
18 First sill cladding part
19 Second sill cladding part
20 Oblique guide surface
21 Connecting element

What is claimed is:

1. A method for producing a motor vehicle, comprising:
producing a substructure and at least one superstructure module of the motor vehicle, the substructure and the superstructure module each having at least one edge region;
painting at least the edge region of the substructure and/or the edge region of the superstructure module; and
connecting, via an adhesive, the edge region of the substructure and the edge region of superstructure module, after the painting of at least the edge region of the substructure and/or the edge region of the superstructure module,
wherein the substructure and the superstructure module are positioned relative to one another by way of a tolerance-compensating screw connection, so that the edge region of the substructure and the edge region of the superstructure module are fixed in the relative position thereof by way of the tolerance-compensating screw connection during curing of the adhesive, the entire tolerance-compensating screw connection being disposed at a position entirely outside of the edge region of the substructure and the edge region of the superstructure module.

2. The method of claim 1, wherein connecting the edge region of the substructure and the edge region of the superstructure module comprises bridging a spacing between the substructure and the superstructure module via the tolerance-compensating screw connection.

3. The method of claim 1, wherein the tolerance-compensating screw connection comprises an automatic tolerance-compensating system.

4. The method of claim 1, wherein the tolerance-compensating screw connection comprises a sleeve with a first internal thread configured for insertion into the substructure or the superstructure module.

5. The method of claim 4, wherein the tolerance-compensating screw connection comprises an adjusting element with an internal thread and an external thread configured for screwing into the first internal thread of the sleeve.

6. The method of claim 5, wherein the tolerance-compensating screw connection comprises a screw with an external thread configured for screwing through the superstructure module or the substructure into the internal thread of the adjusting element and the sleeve.

7. The method of claim 1, wherein the tolerance-compensating screw connection comprises:
a sleeve with a first internal thread configured for insertion into the substructure or the superstructure module;
an adjusting element with an internal thread and an external thread configured for screwing into the first internal thread of the sleeve; and
a screw with an external thread configured for screwing through the superstructure module or the substructure into the internal thread of the adjusting element and the sleeve.

8. The method of claim 1, wherein the substructure has a tongue in the edge region of the substructure and the superstructure module has a groove in the edge region of the superstructure module such that the edge region of the substructure and the edge region of the superstructure module are connectable by introducing an adhesive into the groove as an adhesive bath and then introducing the tongue into the adhesive bath.

9. The method of claim 8, wherein the tongue comprises holes to permit adhesive to pass therethrough.

10. The method of claim 1, wherein the superstructure module has a tongue in the edge region of the superstructure module and the substructure has a groove in the edge region of the substructure such that the edge region of the superstructure module and the edge region of the substructure are connectable may be connected by introducing an adhesive into the groove as an adhesive bath and then introducing the tongue into the adhesive bath.

11. The method of claim 10, wherein the tongue comprises holes to permit adhesive to pass therethrough.

12. The method of claim 1, further comprising keeping the tolerance-compensating screw connection in the motor vehicle.

13. The method of claim 1, wherein:
the superstructure module includes a first side wall and a second side wall having the edge region of the superstructure module; and
the tolerance-compensating screw connection being to connect the first side wall to the substructure while avoiding direct physical contact with the second side wall.

14. A method for producing a motor vehicle, comprising:
producing a substructure and at least one superstructure module of the motor vehicle, the substructure and the superstructure module each having at least one edge region;
painting at least the edge region of the substructure and/or the edge region of superstructure module;
connecting, via an adhesive, the edge region of the substructure and the edge region of the superstructure module, after the painting of at least the edge region of the substructure and/or the edge region of the superstructure module; and
connecting, via a non-adhesive, the substructure and the superstructure module,
wherein the substructure and the superstructure module are positioned relative to one another by way of a tolerance-compensating screw connection, so that the edge region of the substructure and the edge region of the superstructure module are fixed in the relative position thereof by way of the tolerance-compensating screw connection during curing of the adhesive, the entire tolerance-compensating screw connection being disposed at a position entirely outside of the edge region of the substructure and the edge region of the superstructure module.

15. The method of claim 14, wherein:
the superstructure module includes a first side wall and a second side wall having the edge region of the superstructure module; and the tolerance-compensating screw connection being to connect the first side wall to the substructure while avoiding direct physical contact with the second side wall.

16. A method for producing a motor vehicle, comprising:

painting a substructure of the motor vehicle;

painting a superstructure module of the motor vehicle independently of the painting of the substructure;

connecting, via an adhesive, an edge region of the substructure and an edge region of the superstructure module, after the painting of the substructure and the painting of the superstructure module; and permanently connecting, via a tolerance-compensating screw connection, a base part of the substructure and a wall part of the superstructure module by positioning the substructure and the superstructure module relative to one another via the tolerance-compensating screw connection so that the edge regions of the substructure and the superstructure module are fixed relative to one another by way of the tolerance-compensating screw connection during curing of the adhesive, the entire tolerance-compensating screw connection being disposed at a position entirely outside of the edge region of the substructure and the edge region of the superstructure module.

17. The method of claim 16, wherein:

the superstructure module includes a second wall part having the edge region of the superstructure module; and the tolerance-compensating screw connection avoiding direct physical contact with the second wall part.

\* \* \* \* \*